United States Patent Office 3,846,244
Patented Nov. 5, 1974

3,846,244
MICROORGANISM RECOVERY PROCESS
John N. Dew, Lyndon D. Boyer, and Len J. Gawel, Ponca City, Okla., assignors to Continental Oil Company, Ponca City, Okla.
No Drawing. Continuation-in-part of abandoned application Ser. No. 131,389, Apr. 5, 1971. This application Oct. 10, 1972, Ser. No. 296,357
Int. Cl. C12b 1/00
U.S. Cl. 195—104                                                    6 Claims

ABSTRACT OF THE DISCLOSURE

An improvement in the process for recovering microorganisms for fermentation liquids. The improvement comprising the use of a second microorganism as a filter precoat.

BACKGROUND OF THE INVENTION

Field of the Invention

This application is a continuation-in-part of Ser. No. 131,389 filed Apr. 5, 1971, now abandoned.

This invention relates to the production of microorganisms by fermentation processes. This invention further relates to the recovery of said microorganisms resulting from said processes from the fermentation liquid by filtration. This invention further relates to the recovery of bacteria produced by fermentation processed by filtration of the fermentation liquids. This invention further relates to the recovery of said bacteria by filtration using other microorganisms as a precoat for the filters used to recover the bacteria.

Description of the Prior Art

The present world shortage of protein, especially low-cost proteins for consumption by animals and humans is well known. In attempts to alleviate this protein shortage recently there have been developed several biosynthesis procedures whereby protein can be produced by the growth of bacteria or other microorganisms on various hydrogen and carbon-containing substrate materials, especially those that are relatively inexpensive. One of the known techniques of biosynthesis involves growing various yeast, molds, algae or bacteria on carbohydrate substrates. However, this type of biosynthesis, in addition to utilizing expensive feed stocks, frequently requires the addition of expensive vitamins, amino acids and other growth mediums in order to insure the desired microorganism growth.

A recent and more promising technique for biologically synthesizing protein for food and other uses is to culture microorganisms on petroleum hydrocarbon substrates. This latter type of protein biosynthesis is usually conducted in an aqueous biosynthesis bath containing a hydrocarbon feed media, an inoculant of the bacteria to be grown, and an aqueous growth medium in addition to oxygen and other indispensable nutrients and growth factors. This type of protein biosynthesis allows the use of petroleum feeds which are even less expensive than carbohydrates and does not usually require expensive growth factors such as vitamins, amino acids, etc. to be supplied in order to insure proper microorganism cell growth.

One serious drawback to the wide acceptance of these protein biosynthesis techniques, especially when hydrocarbons are employed as predominate feed media, resides in the fact that the product microorganism cells, especially in the case of certain bacteria cells, are often of very small size, e.g. from 0.1 to 4.0 microns and even smaller. With such small sized microorganism cells, it is difficult and expensive to achieve recovery of the product microorganism cells. One factor leading to increased expense in recovery of the product microorganism cells is the difficulty in separating the cells from the aqueous product stream containing them when the cells are present in low concentrations, e.g. 1 to 5 wt. percent. These and other related factors serve to increase the overall cost of recovering the grown microorganisms. Separation and drying procedures can amount to as much as 25 percent or higher of the total cost of producing the microorganisms in a form suitable for use in high protein foods or food supplements. Hence, it will be realized that any substantial improvement in effecting dewatering of microorganism cells especially those having very small cell diameters, prior to separation and drying will result in significant economic savings and thus reduce the overall cost of producing high protein foods and food supplements.

Means used to separate microorganisms from fermentation liquids heretofore used include centrifuges, small pore filters, freezing, and coagulation by use of acids and the like. Each of these methods have certain disadvantages. Centrifugation is usually ineffective on bacteria. The use of small pore filters results in slow filtration and generally low cake capacity for a given filter. Freezing involves considerable additional processing to achieve freezing of the fermentation liquids and subsequent separation of the cells. The use of additional chemicals to coagulate has the disadvantage that undesirable contaminating materials are added to the finished protein supplement material. By contrast the present invention achieves recovery of said bacteria by simple filtration without the addition of any objectionable material to the resulting product.

OBJECTS OF THE INVENTION

An object of the present invention is the recovery of microorganisms from fermentation liquids. A further object of the present invention is the recovery of microorganisms from fermentation liquids by filtration processes. A further objective of the present invention is the recovery of said microorganisms from fermentation liquids by filtration without the addition of contaminants. A further objective of the present invention is to achieve filtration of said microorganisms and bacteria from fermentation liquids without the addition of complex processing steps.

SUMMARY OF THE INVENTION

It has now been found that the objects of the present invention are attained in the process for recovering microorganisms from fermentation liquids containing said microorganisms by the use of a second microorganism as a filter precoat.

DESCRIPTION OF PREFERRED EMBODIMENTS

Microorganisms commonly used for production of proteins by fermentation processes fall into two broad categories, bacteria and yeast. The bacteria grow faster and produce a product higher in protein, however, the bacteria cells are considerably smaller, on the order of about 0.1 to about 4.0 microns in diameter (although many commonly used bacteria are from about 0.2 to about 4.0 microns in diameter) than the yeast cells which are approximately 4 to 10 microns in diameter. Thus it is seen that the bacteria are more desirable but more difficult to recover from the fermentation solutions.

The microorganism diameters referred to herein are the average diameters of the microorganism. Many microorganisms have an irregular shape and may have a major and a minor diameter as is well known to those skilled in the art, but for the purposes of the present application it is believed that the average diameter accurately describes the various microorganisms.

A preferred embodiment of the improvement of the present invention requires the maintenance of two systems: one producing yeast, the other producing bacteria. The yeast is produced in small quantities sufficient only to fulfill requirements as a filter precoat to aid in filtration of the bacteria containing solutions. The bacteria is produced in quantity as the major microorganism product. Any normally used filter may be used to remove the bacteria after being coated with a yeast precoat. Filter sizes ranging from about 1 to about 100 microns pore diameter are suitable. However, filters having pore diameters from about 20 to about 60 microns are preferred. It will be noted that the filter pore diameters are much larger than either the bacteria or yeast particles but we have found that the yeast builds up a cake on such filters suitable for subsequent filtration of the bacteria. The particular filter to be used should be selected by consideration of the particular microorganism used, desired filtration rates, size filter cake desired and the like.

The yeast is applied in a precoat to a thickness suitable to achieve filtration of the bacteria involved. The amount of precoat is fixed to a large degree by the pore size of the filter selected, the size of the bacteria cells, filtration rates desired and the like. It should be pointed out that normally a filter to remove bacteria of the sizes commonly encountered would require pore diameters of from 0.1 to 1.00 microns whereas by means of our invention filters with pore sizes ranging from 1 to 100 are effective.

Advantages realized by use of the present invention over methods used heretofore utilized include better filtration rates, larger pore size filters are effective, larger particle accumulations on a given filter are attained and other advantages which will be obvious to those skilled in the art.

A further advantage which is not available by other methods is that the product used as a filter precoat is a protein bearing product itself and introduces no contaminating material into the product. This is significant, particularly in view of recent trends to require exhaustive testing of each additional component introduced into a food product since both products here are food products and acceptable individually as such. Other methods utilize materials which either must be removed from the product before sale and use or undergo involved testing to establish the allowability of the added material in a food product.

The improvement of the present invention will be found applicable to any systems wherein shall cell microorganisms such as bacteria are to be filtered and a relatively large cell microorganism 1.25 to 100 times the size of the smaller cells, such as yeast is available for precoating a filter to be used in removing the finer cell bacteria. Although the above ratio is effective in the practice of the present invention desirable results have been achieved and a preferred ratio is from about 1.25 to 50. Examples of bacteria which may be recovered from fermentation solutions by means of the present invention are: *Micrococcus* species, *Pseudomonas* species, *Bacillus* species and *Corynebacterium* species. Larger microorganisms suitable for precoating filters and recovering bacteria such as those listed above are yeasts such as: *Candida tropicalis, Candida lipolytica, Candida utilis, Saccharomyces cerevisiae* and *Torulopsis utilis* strains. The improvement of the present invention is by no means limited to the above-listed materials and microorganisms, which are cited for illustrative purposes, but is applicable as noted above to any system where a small cell microorganism product is to be recovered and a suitable larger cell microorganism is available for precoating the filter.

Thus, it is seen that the improvement of our invention offers several advantages over heretofore known methods. In particular, fewer processing steps are involved resulting in considerably easier process control requirements, no contaminating material is required to recover the microorganism product and all recovered material is usable as product. Other advantages may appear to those skilled in the art upon a study of the foregoing and following examples.

EXAMPLES

A bacteria-produced slurry (*Pseudomonas* species) was found to contain 3.56 grams/liter dry solids. One liter of this slurry was filtered through a 2.5 inch buchner funnel provided with Whatman* No. 1 filter paper and a partial vacuum. A total of 1.4 grams of bacterial cells (dry basis) was recovered in about two minutes. Recovery of bacteria by filtration was thus $$\frac{1.4}{3.56}(100)$$

or 39.4 percent.

A yeast produced slurry (*Candida tropicalis*) was used to precoat a 2.5 inch buchner funnel fitted with Whatman* No. 1 filter paper and a partial vacuum. The yeast slurry analyzed 8.7 g./l. dry solids. A precoat of 0.87 grams of yeast solids (dry basis) was prepared from 100 ml. of the yeast slurry by filtering said yeast solution through the filter. The bacteria filtration described above was then repeated. Conditions were the same except that about 5 minutes were needed to filter the same amount of material. This time the gross solids (dry basis) recovered by filtration totaled 3.2 grams. Subtracting the precoat of 0.87 grams of yeast (dry basis) gives a net recovery of 2.33 grams of bacterial cells (dry basis). Bacteria recovery in this case was then $$\frac{2.33}{3.56}(100)$$

or 65.5 percent.

From the above tests, precoating the filter with yeast increased recovery of bacteria by $$\frac{2.33-1.4}{1.4}(100)$$

or 66.4 percent.

Thus it is readily seen that this process improvement significantly increases the recovery of the difficultly separable bacteria cells over methods attempting filtration of the bacteria containing solution alone.

Having thus described the invention, we claim:

1. In the process for recovering bacteria from fermentation liquids containing said bacteria by filtration, the improvement comprising precoating the filter with a yeast having an average cell diameter of at least 1.25 times the average cell diameter of the bacteria being recovered.

2. The improvement of Claim 1 wherein said yeast has an average cell diameter from about 1.25 to about 100 times that of the bacteria being recovered.

3. The improvement of Claim 1 wherein said yeast has an average cell diameter from about 1.25 to about 50 times that of the bacteria being recovered.

―――――――
*Registered trademark—W & R Balston Ltd.

4. The improvement of Claim 1 wherein said bacteria are selected from the group consisting of *Micrococcus* species, *Pseudomonas* species, *Bacillus* species and *Corynebacterium* species.

5. The improvement of Claim 1 wherein said yeast is selected from the group consisting of *Candida tropicalis*, *Candida lipolytica*, *Candida utilis*, *Saccharomyces cerevisiae*, and *Torulopsis utilis* strains.

6. The improvement of Claim 1, wherein said bacteria is a *Pseudomonas* species, said yeast is a *Candida tropicalis* strain of yeast and a pressure differential is used to increase the rate of filtration.

References Cited
UNITED STATES PATENTS

| | | | |
|---|---|---|---|
| 3,293,174 | 12/1966 | Robjohns | 210—17 |
| 3,061,518 | 10/1962 | Auerswald et al. | 210—75 |
| 3,448,011 | 6/1969 | Russomanno | 195—139 |

A. LOUIS MONACELL, Primary Examiner

T. G. WISEMAN, Assistant Examiner

U.S. Cl. X.R.

210—75